United States Patent [19]

Pusl

[11] Patent Number: 4,647,015

[45] Date of Patent: Mar. 3, 1987

[54] APPARATUS FOR APPLYING, MAINTAINING AND RELEASING A PULLING FORCE

[75] Inventor: Kenneth E. Pusl, Valencia, Calif.

[73] Assignee: Garich Engineering, Meadow Vista, Calif.

[21] Appl. No.: 658,503

[22] Filed: Oct. 9, 1984

[51] Int. Cl.$^4$ .............................. B21F 9/00; B66F 3/00
[52] U.S. Cl. ..................................... 254/230; 254/262
[58] Field of Search ............... 254/230, 241, 341, 345, 254/12, 6 R; 24/68 B, 71.1, 272, 524, 527; 294/16, 92; 279/110, 117; 81/128

[56] References Cited

U.S. PATENT DOCUMENTS

| | | | |
|---|---|---|---|
| 592,226 | 10/1897 | Ingram et al. | 254/230 |
| 605,848 | 6/1898 | Borst | 254/230 |
| 1,509,715 | 9/1924 | Dacar | 254/230 |
| 1,894,556 | 1/1933 | Edlund | 294/16 X |
| 2,526,216 | 10/1950 | Gartner | 24/71.2 |
| 3,033,531 | 5/1962 | Patterson et al. | 254/341 |
| 3,806,992 | 4/1974 | Reimer | 24/71.2 |
| 4,461,460 | 1/1984 | Telford | 254/345 |

FOREIGN PATENT DOCUMENTS 48638 2/1921 Sweden ...................... 254/230

*Primary Examiner*—Stuart S. Levy
*Assistant Examiner*—Katherine Matecki

[57] ABSTRACT

An apparatus for translating rotational movement into linear motion primarily for the purpose of repeatably generating and maintaining a constricting force. A means to employ mechanical advantage to amplify the translation of rotational energy into linear energy and provides for the equally repeatable release of said forces.

1 Claim, 1 Drawing Figure

U.S. Patent   Mar. 3, 1987   4,647,015
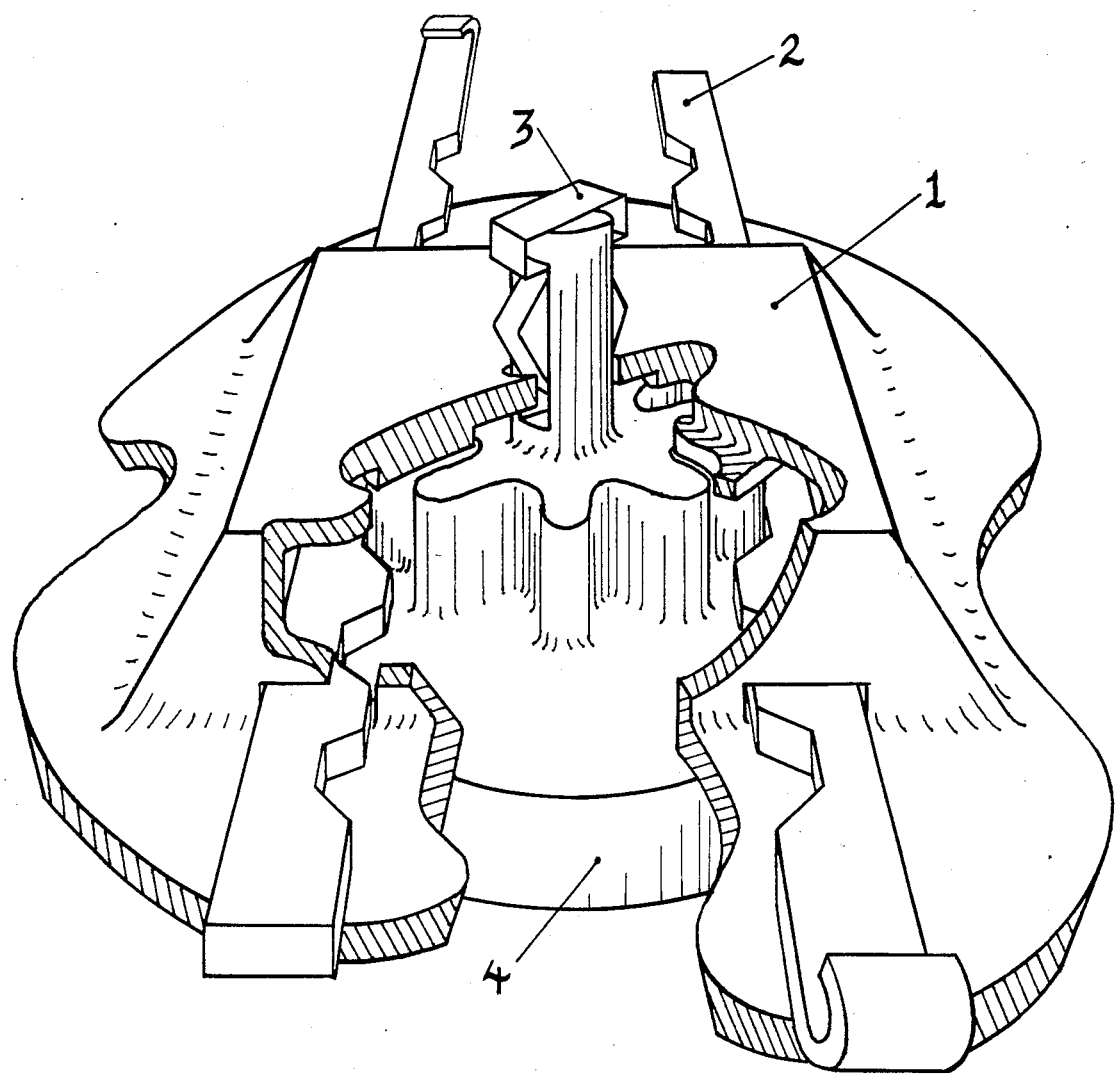

APPARATUS FOR APPLYING, MAINTAINING AND RELEASING A PULLING FORCE

BACKGROUND OF THE INVENTION

1. Field of the Invention

This invention relates to apparatus intended to provide a constricting force between two points.

2. Description of the Prior Art

In certain applications it is required or at least desirable to join or attach a body to another body by developing a constricting force. By way of example, a device exerting a constricting force on opposite sides of a cube would also draw itself toward the face of the cube between the two sides. Given sufficient purchase on the sides of the cube, the forces exerted by the device can be significant, at least to the degree to provide attachment.

Various types of devices for providing a constricting force are well known in the prior art. By way of example, U.S. Pat. Nos. 592,226 and 605,848 both provide a constricting force by a gear driving two racks, located by a housing and maintained by a pawl.

U.S. Pat. No. 1,509,715 discloses a device, complex by comparison on to the other wire stretchers, with a provision for maintaining forces bi-directionally along the constricting axis, again by a pawl mechanism. A second device, Sweden Pat. No. 48,638, also maintains bi-directional position with a dual pawl acting directly on the square cut racks.

While each of the disclosures cited provide a constricting force, it should be noted that the force is not maintained by the relative shapes of the driving element and the housing. Further, each of the housings disclosed show no intent to attach themselves to the body upon which they exert the constricting force.

SUMMARY OF THE INVENTION

An object of this invention is to minimize the number of components of the apparatus providing for economical manufacture and simplified operation.

Another object of this invention is to provide a mechanical configuration that lends itself to the widest variety of production processes and materials.

Another object of this invention is to provide the most universally applicable and mechanically stable pulling forces, between two points.

Another object of this invention is that it is adjustable and reusable.

Another object of this invention is to provide a means for amplifying the pulling force by mechanical advantage.

Other objects will be in part obvious and in part pointed out more in detail hereinafter.

This invention accordingly consists of features of construction, combination of elements, configuration of those elements and arrangements of parts which is exemplified in the construction hereafter set forth, and the scope of the invention is indicated in the appended claim.

BRIEF DESCRIPTION OF THE DRAWING

The single FIGURE is a sectioned perspective view the pulling device.

DESCRIPTION OF THE PREFERRED EMBODIMENT

Referring to the drawing in detail, there is shown a housing 1, which may be a portion of the object being retained, which establishes the relationship of the other elements of this invention by providing bearing surfaces for them. The housing includes a round hole which supports a matching shaft, two sets of rectangular openings which guide parallel rack elements 2 on opposite sides of the hole. The housing further includes a recessed cavity having an internal gear form on its lower surface as shown in the FIGURE, the internal gear form being concentric with the hole and providing a locking feature. The housing and the three bearing surfaces may be manufactured by molding, stamping, machining or otherwise forming them in an item to be drawn toward two other points by the balance of this invention, or they may be manufactured as a separate element so the invention may exert a pulling force on two opposing points. The racks 2 are provided with square cut gear teeth on adjacent sides and are supported in the rectangular openings. The two racks may be identically shaped for economy of manufacture and may be fabricated from flexible materials to increase the scope of operation of this invention's pulling force. At one end of the rack is a means of attachment and at the opposite end a blank area with no gear teeth to prevent the racks from being pulled or driven out of the apparatus. The racks 2 are mounted in opposite, parallel directions by a driving member 4 which is integral with the shaft and includes a lower drive knob portion and a gear portion formed on the upper surface of the drive knob as shown in the FIGURE. The gear portion engages the teeth of racks 2 and moves them when the knob portion is rotated. A spring clip 3 is received in a rectangular hole in the shaft and retained relative thereto by its upper portion, which also prevents disassembly of the shaft from the hole. The lower, slanted portions of spring clip 3 selectively retain the driving member in a lower, free position or an upper, locked position as shown in the FIGURE. In the locked position the gear portion is received in the internal gear form to lock the racks against movement.

For certain applications when appropriate materials are indicated the spring clip 3 may be incorporated into the driving member 4, thereby eliminating the additional piece and the rectangular hole through the side of the shaft. The driving member 4 may be provided with a suitable gripping surface to facilitate movement of said member axially through the hole or to rotate the member.

I claim:

1. Apparatus for applying a pulling force comprising:
    a housing including a recessed portion, a hole through the recessed portion, an internal gear form on the recessed portion concentric with the hole, and two guide means;
    two elongated racks which are received in the guide means, the guide means being located in the housing such that the racks are parallel to each other and on opposite sides of the hole, the racks each having gear teeth along their length, attachment means at one end, and a blank portion having no gear teeth at the other end;
    a driving member comprising a shaft, the shaft being rotatably and axially slidably mounted in the hole, a gear coaxial with the shaft and fixed thereto, and a drive knob coaxial with and fixed to the gear, the gear engaging the gear teeth of the racks so that rotation of the drive knob causes parallel movement of the racks in opposite directions;

and a spring clip and spring clip mounting means on the shaft, the spring clip including locking means which locks the driving member in either a first axial position wherein the gear is engaged with the racks only, or a second axial position, wherein the gear is engaged with both the internal gear form and the racks, thereby locking the driving member against rotation and preventing relative movement of the racks.

* * * * *